Feb. 8, 1949.  C. C. SZAJ  2,461,130
ROSARY UNIT
Filed Feb. 4, 1946
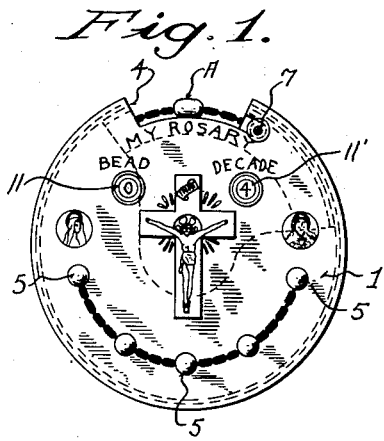
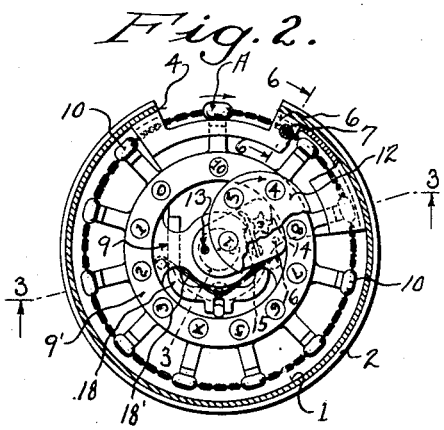
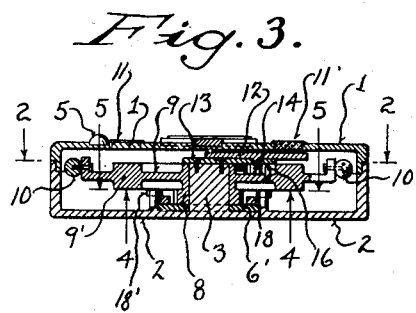
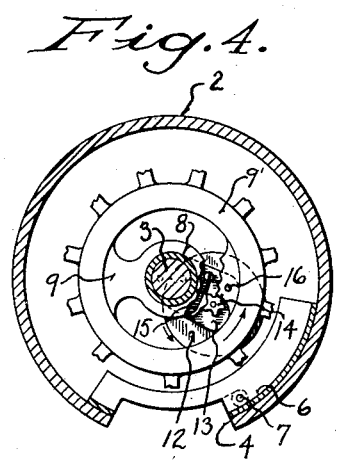
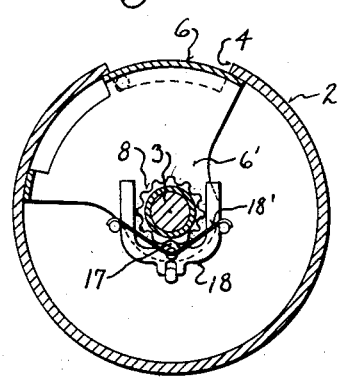
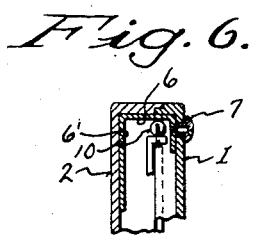
INVENTOR
CASIMIR C. SZAJ
BY
ATTORNEYS

Patented Feb. 8, 1949

2,461,130

UNITED STATES PATENT OFFICE 2,461,130

ROSARY UNIT

Casimir C. Szaj, Hales Corners, Wis.

Application February 4, 1946, Serial No. 645,381

1 Claim. (Cl. 235—123)

My invention refers to prayer beads and it has for its primary object to provide a self contained encased rotary wheel mounted in a casing carrying one decade of a rosary, whereby the same, in a compact unit, may be conveniently carried about the person, the said casing being also ornamental.

A further object of my invention is to provide a casing of the watch type, into which is mounted a spoked wheel carrying a single decade of beads thereon, the casing having a peripheral orifice therein to expose one bead at a time, whereby the same may be manually shifted with each prayer to move a successive bead to the orifice.

A still further object of my invention is to provide a disc carrying star wheel to be actuated by a tappet pin mounted upon the bead decade wheel, whereby the star wheel is actuated one space with each revolution of the decade wheel. The casing has a pair of sight openings therein to indicate, by numerals, each prayer told by the decade wheel. The star wheel is provided with numerals, which are exposed through its companion opening, to indicate the completion of each repeated decade.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Fig. 1 represents a front face view of a rosary unit embodying the features of my invention.

Fig. 2 is a longitudinal sectional front view of the same, the section being indicated by line 2—2 of Fig. 3.

Fig. 3 is a cross section of the unit, the section being indicated by line 3—3 of Fig. 2.

Fig. 4 is a longitudinal sectional view through the casing illustrating a fragment of the bead carrying wheel and disc with the star wheel mechanism, the section being indicated by line 4—4 of Fig. 3.

Fig. 5 is another longitudinal sectional view of the unit, the same particularly illustrating the toothed pinion locking means together with a closure hood for the casing orifice, or opening, the section being indicated by line 5—5 of Fig. 3; and Fig. 6 is a fragmentary detail cross sectional view through the casing and closure hood for the orifice, the section being indicated by line 6—6 of Fig. 2.

Referring by characters to the drawings, 1 indicates a flanged front casing wall and 2 a similar flanged rear casing wall, which wall has extending inwardly therefrom a hub 3. The flanged casing walls are shouldered for snap fitting engagements with each other and the said separable walls may be secured in any suitable manner.

The upper portion of the circular casing is cut away to form a segmental orifice 4, it being apparent that the front face is provided with the usual crucifix and a series of chain connected beads 5 in conjunction with the crucifix. These embossed beads form the beginning of a rosary consisting of the Apostles Creed in conjunction with the Our Father and Hail Marys.

As best indicated in Figs. 2 and 5 of the drawings, the orifice 4 is provided with an oscillatory closure hood 6, which hood, for convenience in construction, is provided with an inwardly extended plate 6' that is rotatively mounted upon the hub 3, it being understood that the hood is manipulated back and forth over the orifice by a button 7. The hood is particularly provided for closing the orifice to render the same dust tight when the instrument is not in use.

Journaled upon the fixed hub 3 is a toothed pinion 8, which pinion forms part of the hub of a decade wheel 9. As best shown in Fig. 2 of the drawings, the decade wheel is formed with a plurality of spokes extending from a ring portion 9' of said wheel.

Each spoke has secured thereto a bead 10, which beads, for ornamental purposes, are connected by chain sections. The spokes are equally divided to the number of eleven, and the eleventh spoke has a bead A, which is spaced a predetermined distance further from either associated spoke, whereby, when the bead A is in its exposed vertical position, as shown in Fig. 2, it will indicate the starting point of a decade.

As indicated in Figs. 1 and 3 of the drawings, the front face wall of the casing is formed with oppositely disposed eye openings 11—11', respectively, and, as indicated in Fig. 2 of the drawings, the ring 9' of the decade wheel is numbered from 0 to 10, respectively, and the bead A is indicated by the numeral 10. Hence, after the "Our Father" is said from bead A, said bead is moved in the direction of the arrow to expose the first bead of the decade, which is indicated by the numeral 1, and thereafter the beads are moved from left to right to complete the decade, or total revolution of the wheel. Hence, in order to keep a record of the units comprising a decade, the number of the beads will be displayed through the eye opening 11.

In order to preserve a visual record of each decade as it is completed, I provide a rotatory disc 12, the pintle of which is mounted in an arm 13, which arm is secured by screws to the hub 3. The disc pintle has secured thereto a star wheel 14 and, as best shown in Fig. 4 of the drawings, the star wheel movement is intermittently locked by a flat spring 15 mounted upon the arm 13.

The star wheel is provided with five teeth and it is actuated by a tappet pin 16, which pin is carried by the decade wheel 9. Hence, with each revolution of the decade wheel, the tappet pin 16 will engage a tooth of the star wheel 14, whereby one of the five numbers carried by the disc will be exposed at the eye opening 11' to indicate to the user, for example as shown in Fig. 1, that four decades have been completed.

As best indicated in Fig. 5, of the drawings, the pinion wheel 8 is formed with eleven teeth corresponding in number to the spokes of the decade wheel. Due to this gear connection, when the decade wheel 9 is shifted from left to right one tooth, a dog 17 is adapted to engage between a pair of the pinion teeth and lock said bead in its exposed aligned position, with reference to the orifice 4. This lock, step by step, of the wheel is maintained by a bracket 18 carrying the dog 17, and the said bracket is forced into engagement with the pinion by a spring 18', it being understood that the bracket is suitably guided in lugs extending from the rear inner face of the casing unit 2.

From the foregoing description it is apparent that a person wishing to say a rosary, all that is required is to first shift the hood from left to right by the button 7 to expose the bead A, and thereafter, for example, five decades may be said by simply rotating the spoked wheel step by step until the rosary is completed.

I claim:

In an indicating instrument having a casing, a pair of eyes and an open slot in the front wall thereof, a pin carried numbered wheel having its periphery exposed in the front wall slot; the combination of a registering mechanism comprising an integral hub extending from the rear wall of the casing upon which the numbered wheel is journaled, a fixed arm radially extending from the end of the casing hub adjacent the front face of said wheel to confine the same against end play upon said hub, a numbered disc faced against the arm, a pintle carried by the numbered wheel extending through the arm, a spring controlled star wheel secured to the disc pintle upon the inner face of the arm, a pin carried by the numbered wheel engageable with the star wheel, guide lugs extending from the casing wall about the hub, an arm bracket reciprocatively mounted between the said numbered wheel and casing wall, whereby it is confined, a bow spring carried by the bracket having its ends engaging a pair of the guide lugs, and a dog extending from the central portion of the bracket engageable with the teeth of the star wheel.

CASIMIR C. SZAJ.

REFERENCES CITED

The following references are of record in the file of this patent:

UNITED STATES PATENTS

| Number | Name | Date |
|---|---|---|
| 573,106 | Reichenbach | Dec. 15, 1896 |
| 643,515 | Marler | Feb. 13, 1900 |
| 767,871 | Corbin | Aug. 16, 1904 |
| 892,492 | Zimmerman | July 7, 1908 |
| 1,324,524 | Silver | Dec. 9, 1919 |
| 2,187,664 | Rogus | Jan. 16, 1940 |